United States Patent
Yorozu

(10) Patent No.: US 10,960,608 B2
(45) Date of Patent: Mar. 30, 2021

(54) FABRICATING APPARATUS, CONTROL DEVICE, AND FABRICATING METHOD

(71) Applicant: Yasuaki Yorozu, Kanagawa (JP)

(72) Inventor: Yasuaki Yorozu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/367,757

(22) Filed: Mar. 28, 2019

(65) Prior Publication Data
US 2019/0299538 A1    Oct. 3, 2019

(30) Foreign Application Priority Data
Mar. 29, 2018    (JP) .............................. JP2018-065050

(51) Int. Cl.
| | |
|---|---|
| *B29C 64/393* | (2017.01) |
| *B29C 64/106* | (2017.01) |
| *B33Y 50/02* | (2015.01) |
| *G05B 19/4099* | (2006.01) |
| *B33Y 10/00* | (2015.01) |

(Continued)

(52) U.S. Cl.
CPC .......... *B29C 64/393* (2017.08); *B29C 64/106* (2017.08); *B33Y 50/02* (2014.12); *B33Y 10/00* (2014.12); *B33Y 30/00* (2014.12); *G05B 15/02* (2013.01); *G05B 19/4099* (2013.01); *G05B 2219/49007* (2013.01)

(58) Field of Classification Search
None
See application file for complete search history.

(56) References Cited

U.S. PATENT DOCUMENTS

| | | |
|---|---|---|
| 2002/0104973 A1 | 8/2002 | Kerekes |
| 2015/0088292 A1* | 3/2015 | Inoue .................... B22F 3/008 700/98 |

(Continued)

FOREIGN PATENT DOCUMENTS

| | | |
|---|---|---|
| DE | 4112695 A1 | 7/1992 |
| JP | 2015-058678 | 3/2015 |

(Continued)

OTHER PUBLICATIONS

Steenhuis, Harm-Jan, and Leon Pretorius. "Consumer additive manufacturing or 3D printing adoption: an exploratory study." Journal of Manufacturing Technology Management vol. 27, No. 7 (2016) pp. 990-1012. DOI: 10.1108/JMTM-01-2016-0002. Retrieved from Proquest.com Apr. 9, 2020. (Year: 2016).*

(Continued)

*Primary Examiner* — Mohammad Ali
*Assistant Examiner* — Joshua T Sanders
(74) *Attorney, Agent, or Firm* — Harness, Dickey & Pierce, P.L.C.

(57) ABSTRACT

A fabricating apparatus includes a fabricating device and processing circuitry. The fabricating device fabricates a fabrication layer according to fabrication data of a three-dimensional object. The processing circuitry measures a planar shape of the fabrication layer; and corrects fabrication data of another fabrication layer to be fabricated onto the fabrication layer according to the planar shape of the fabrication layer measured by the measurement unit and the fabrication data of the fabrication layer.

15 Claims, 11 Drawing Sheets

(51) Int. Cl.
*B33Y 30/00* (2015.01)
*G05B 15/02* (2006.01)

(56) References Cited

U.S. PATENT DOCUMENTS

| | | |
|---|---|---|
| 2015/0158249 A1 | 6/2015 | Goto |
| 2015/0174828 A1 | 6/2015 | Creuzer et al. |
| 2015/0198943 A1 | 7/2015 | Kotlus |
| 2015/0210011 A1 | 7/2015 | Conrow et al. |
| 2016/0136896 A1 | 5/2016 | Wighton |
| 2016/0375640 A1 | 12/2016 | Cho et al. |
| 2017/0050374 A1 | 2/2017 | Minardi et al. |
| 2017/0057170 A1 | 3/2017 | Gupta et al. |
| 2017/0337748 A1* | 11/2017 | Takebe ................. G06T 1/0007 |
| 2018/0169953 A1 | 6/2018 | Matusik et al. |

FOREIGN PATENT DOCUMENTS

| | | |
|---|---|---|
| JP | 2016-137653 | 8/2016 |
| JP | 2016-137654 | 8/2016 |
| JP | 2017-530027 | 10/2017 |
| JP | 2017-205975 | 11/2017 |
| JP | 2018-008403 | 1/2018 |
| WO | WO2015/081009 A1 | 6/2015 |
| WO | WO2015/184495 A1 | 12/2015 |
| WO | WO-2019/068792 A1 | 4/2019 |

OTHER PUBLICATIONS

Extended European Search Report dated Sep. 5, 2019.

\* cited by examiner

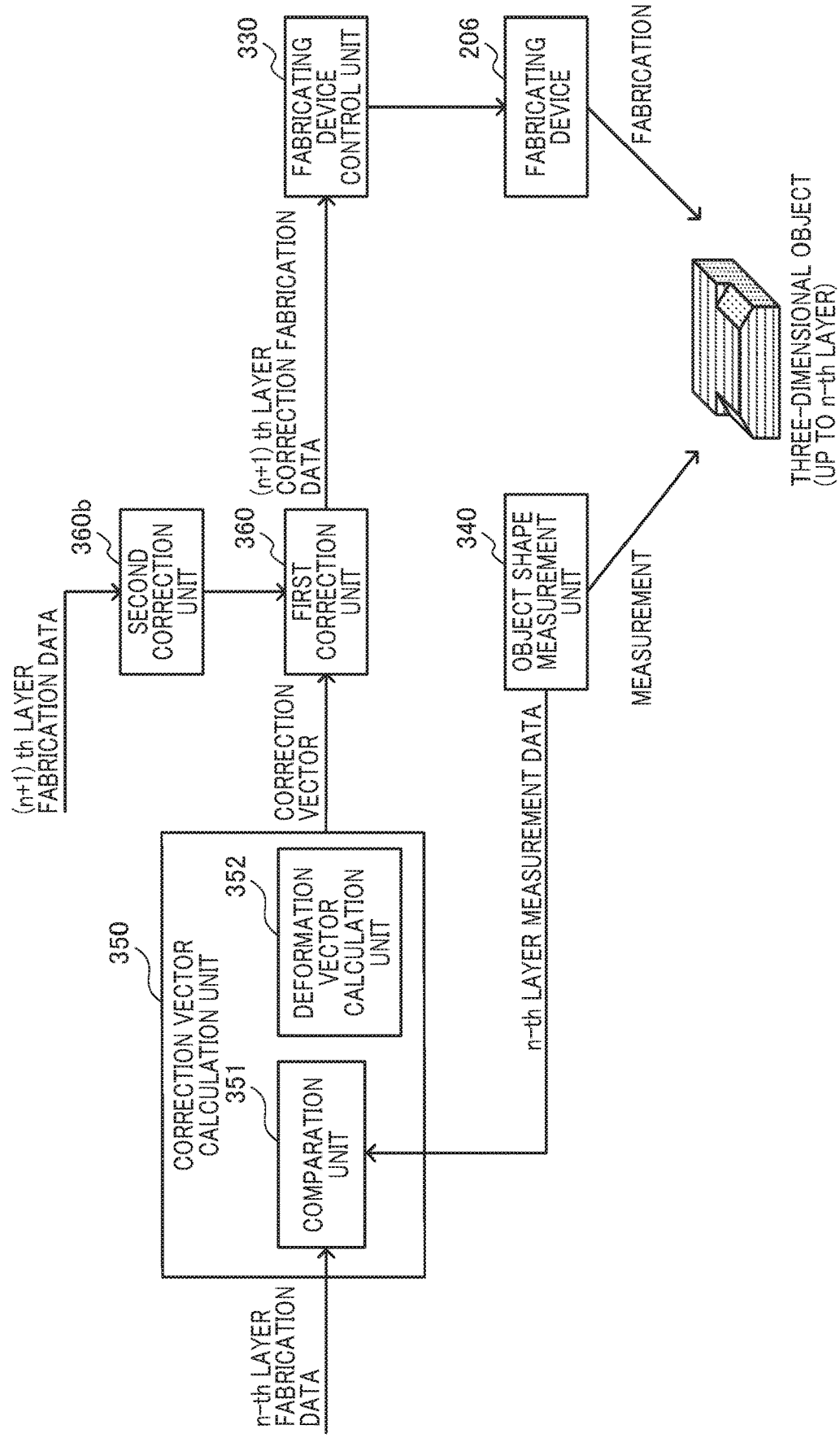

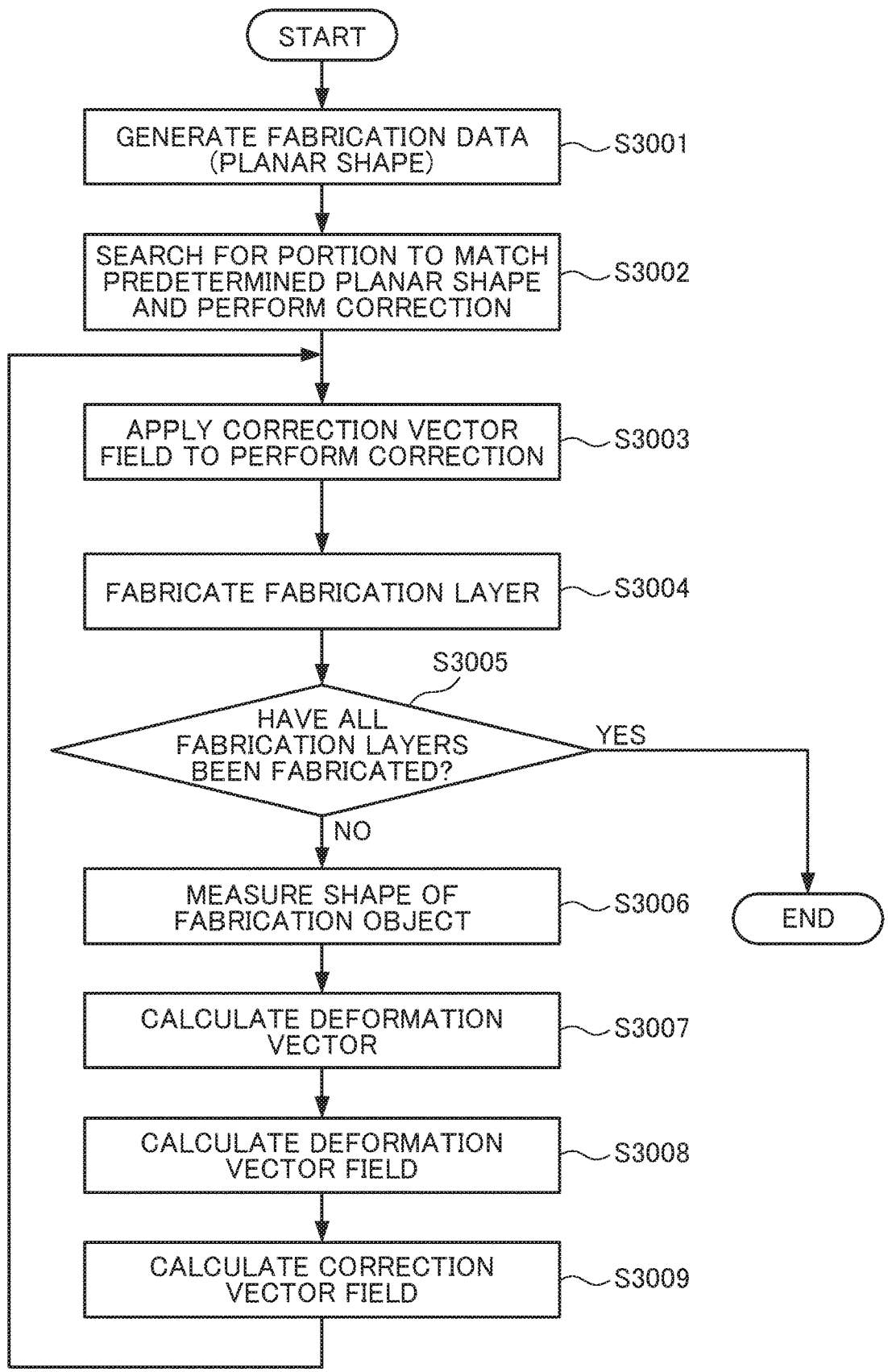

FABRICATING APPARATUS, CONTROL DEVICE, AND FABRICATING METHOD

CROSS-REFERENCE TO RELATED APPLICATION

This patent application is based on and claims priority pursuant to 35 U.S.C. § 119(a) to Japanese Patent Application No. 2018-065050, filed on Mar. 29, 2018, in the Japan Patent Office, the entire disclosure of which is hereby incorporated by reference herein.

BACKGROUND

Technical Field

Aspects of the present disclosure relate to a fabricating apparatus, a control device, and a fabricating method.

Related Art

A fabricating apparatus (also referred to as a "3D printer") for fabricating a three-dimensional object according to input data has been developed. Various methods proposed as a method for performing three-dimensional fabrication include, for example, Fused Filament Fabrication (FFF), Selective Laser Sintering (SLS), Material Jetting (MJ), an Electron Beam Melting (EBM) method, and a Stereolithography Apparatus (SLA) method.

There are cases, however, where a desired three-dimensional object cannot be fabricated, leading to a necessity to correct fabrication processing.

SUMMARY

In an aspect of the present disclosure, there is provided a fabricating apparatus that includes a fabricating device and processing circuitry. The fabricating device fabricates a fabrication layer according to fabrication data of a three-dimensional object. The processing circuitry measures a planar shape of the fabrication layer; and corrects fabrication data of another fabrication layer to be fabricated onto the fabrication layer according to the planar shape of the fabrication layer measured by the measurement unit and the fabrication data of the fabrication layer.

In another aspect of the present disclosure, there is provided a control device to control operation of a fabricating apparatus that fabricates a three-dimensional object. The control device includes processing circuitry to correct fabrication data of another fabrication layer to be fabricated onto a fabrication layer, according to a planar shape of the fabrication layer measured and fabrication data of the fabrication layer.

In still another aspect of the present disclosure, there is provided a method for fabricating a three-dimensional object. The method includes fabricating a fabrication layer according to fabrication data, measuring a planar shape of the fabrication layer, correcting fabrication data of another fabrication layer according to the planar shape of the fabrication layer measured by the measuring and the fabrication data of the fabrication layer, and fabricating said another fabrication layer according to the fabrication data corrected by the correcting.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is a diagram illustrating a data flow in the present embodiment;

FIG. 9 is a flowchart of main fabrication processing according to the present embodiment.

Figure 1A:
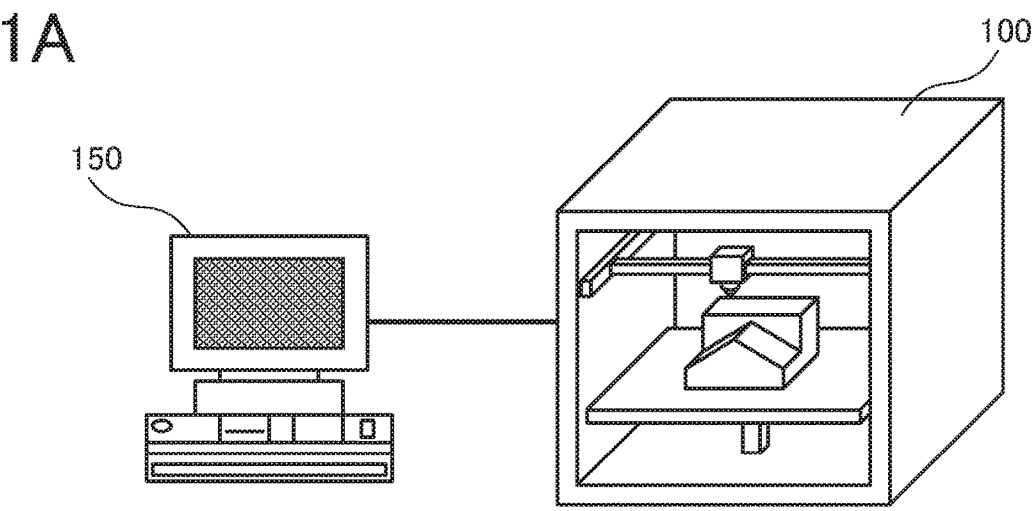
FIGS. 1A to 1C are views illustrating a schematic configuration of an entire three-dimensional fabricating system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, the present disclosure will be described with reference to embodiments. However, the present disclosure is not limited to each of embodiments described below. In each of the drawings referred to below, the same reference numerals are used for same elements, and the description of the elements is omitted as appropriate. Furthermore, while the following is description of example embodiments of the present disclosure by using an FFF type fabricating apparatus, the following is not intended to limit the embodiment.

In the following description, for the sake of convenience of explanation, it is assumed that the height direction of the three-dimensional object is defined as a z-axis direction and a plane orthogonal to the z-axis is defined as an x-y plane.

Figure 1B:
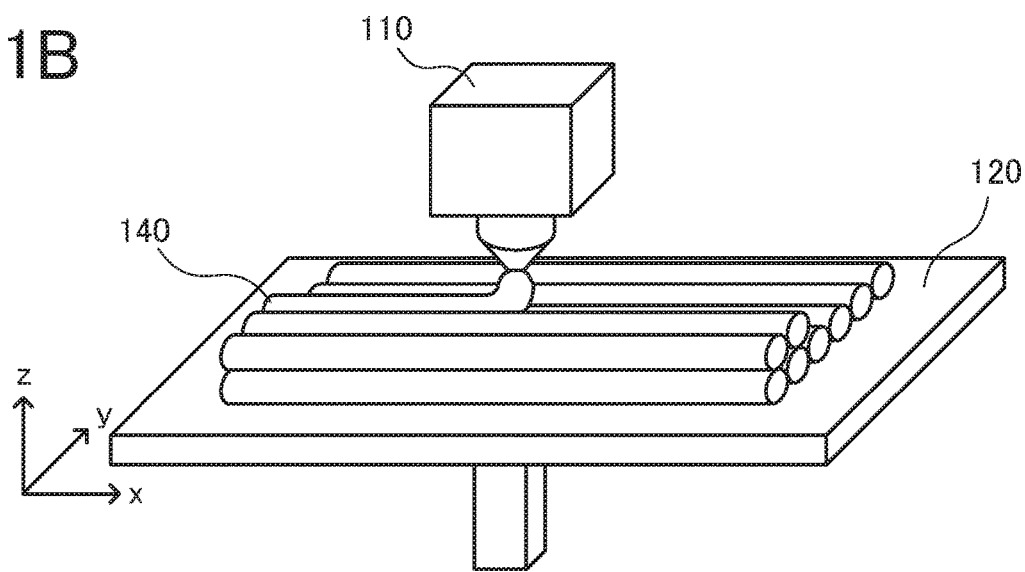
Figure 1C:
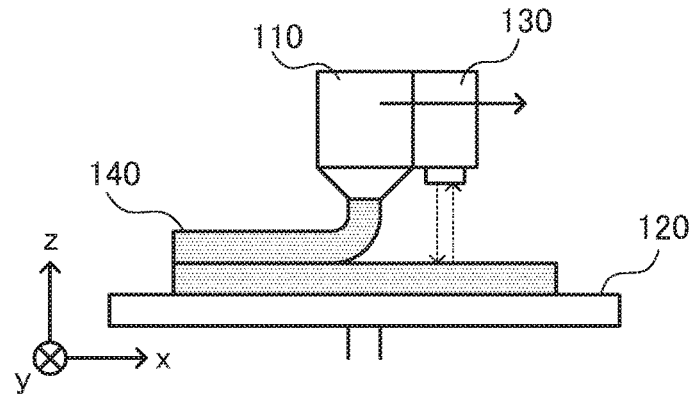

FIGS. 1A to 1C are views illustrating a schematic configuration of an entire three-dimensional fabricating system according to an embodiment of the present disclosure. As illustrated in FIG. 1A, the three-dimensional fabricating system includes a fabricating apparatus 100 that fabricates a three-dimensional object. For example, shape data of a three-dimensional object to be fabricated is transmitted from an information processing terminal 150 to the fabricating apparatus 100, and the fabricating apparatus 100 fabricates the three-dimensional object according to the shape data. In addition, the information processing terminal 150 may operate as a control device that controls processing executed by the fabricating apparatus 100. Note that the function of the information processing terminal 150 may be incorporated in the fabricating apparatus 100.

As illustrated in FIG. 1B, a fabrication material 140 is discharged from a head 110 movable in parallel to the x-y plane, onto a stage 120, so as to fabricate a fabrication layer on the x-y plane. One-dimensional line is drawn in an identical plane so as to fabricate a single fabrication layer out of the three-dimensional object. After fabrication of a first fabrication layer, the stage 120 is lowered by the height of one layer (stacking pitch) in the direction along the z-axis. Thereafter, the head 110 is driven similarly to the first layer to fabricate a second fabrication layer. The fabricating apparatus 100 repeats these operation procedures to stack the fabrication layers so as to fabricate a three-dimensional object. The above-described configuration is an example in which the head 110 moves in the x-y plane and the stage 120 moves in the z-axis direction. However, the configuration described above is not limited to the present embodiment, and other configurations may be adopted.

In addition, the fabricating apparatus 100 of the present embodiment includes a sensor 130 for measuring the shape of the fabrication layer being fabricated or an already-fabricated three-dimensional object. The sensor 130 may measure the x-y plane of the fabrication layer. As illustrated in FIG. 1C, in a preferred embodiment, the sensor 130 may measure the shape of the fabrication layer during fabrication in conjunction with the fabricating operation performed by the head 110, for example. The measurement of a three-dimensional object may be performed each time a single fabrication layer is fabricated. Note that the timing and range of the measurement of the three-dimensional object are optional, and the embodiment is not limited by these in particular.

Figure 2:
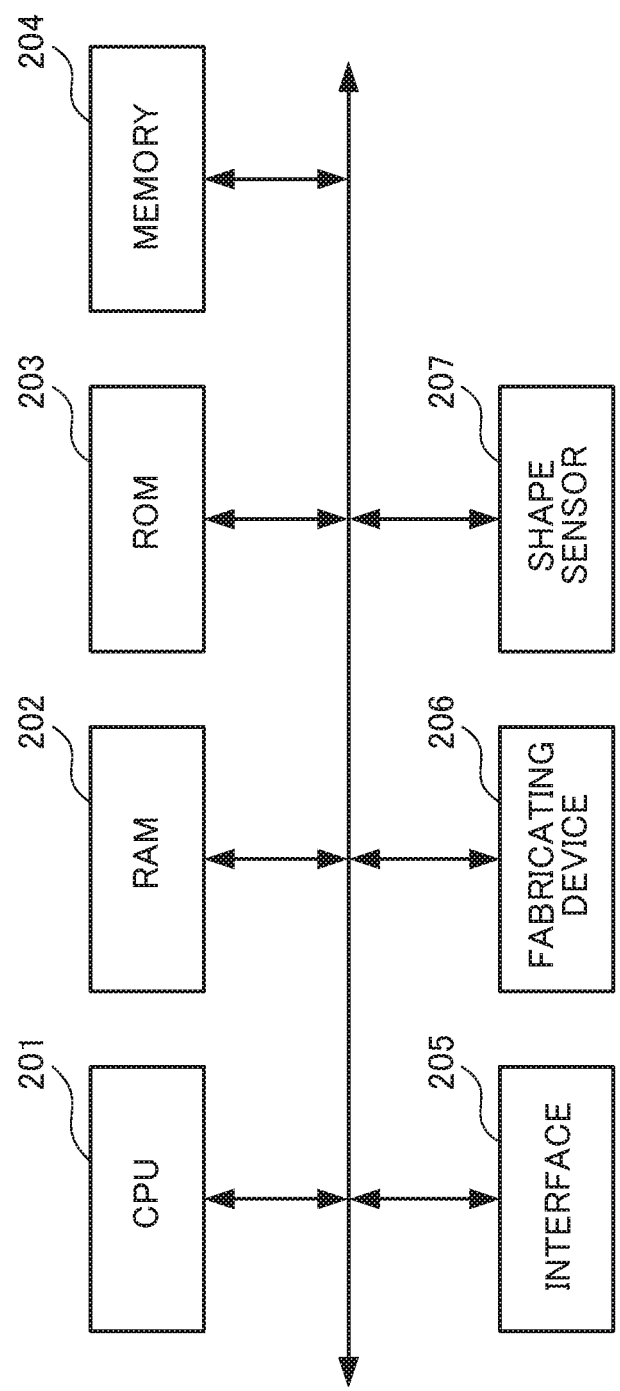
FIG. 2 is a diagram illustrating a hardware configuration included in a fabricating apparatus according to the present embodiment.

Next, a hardware configuration of the fabricating apparatus 100 will be described. FIG. 2 is a diagram illustrating a hardware configuration included in the fabricating apparatus 100 according to the present embodiment. The fabricating apparatus 100 includes a central processing unit (CPU) 201, a random access memory (RAM) 202, a read only memory (ROM) 203, a memory 204, an interface 205, a fabricating device 206, and a shape sensor 207. Each of the hardware components is interconnected via a bus.

The CPU 201 executes a program that controls the operation of the fabricating apparatus 100 so as to perform predetermined processing. The RAM 202 is a volatile memory for providing an execution space for a program to be executed by the CPU 201 and is used for storing and expanding programs and data. The ROM 203 is a nonvolatile memory for storing programs to be executed by the CPU 201, firmware, or the like.

The memory 204 is a readable/writable nonvolatile memory that stores an OS, various applications, setting information, various data, or the like, that allow the fabricating apparatus 100 to function. The interface 205 is a device that connects the fabricating apparatus 100 with another device. The interface 205 can be connected with the information processing terminal 150, a network, an external memory, for example, and thus, it is possible to receive data for controlling fabricating operation and three-dimensional object shape data through the interface 205.

The fabricating device 206 is a device that fabricates a fabrication layer according to the fabrication data. The fabricating device 206 is configured in accordance with the fabrication method, including the head 110 and the stage 120. For example, the fabricating device 206 using the FFF method further includes a heating mechanism for melting the fabrication material 140, a nozzle for discharging the fabrication material 140, or the like. The fabricating device 206 using the SLS method further includes a laser light source, or the like.

The shape sensor 207 is a device to measure the shape of a fabrication layer being fabricated or an already-fabricated three-dimensional object. The shape sensor 207 may measure the x-y plane of the fabrication layer. Furthermore, the shape sensor 207 may measure dimensions in the x-axis, y-axis, and z-axis directions of the three-dimensional object. Examples of the shape sensor 207 include an infrared sensor, a camera, and a 3D measurement sensor (for example, a light-section profile sensor).

Figure 3:
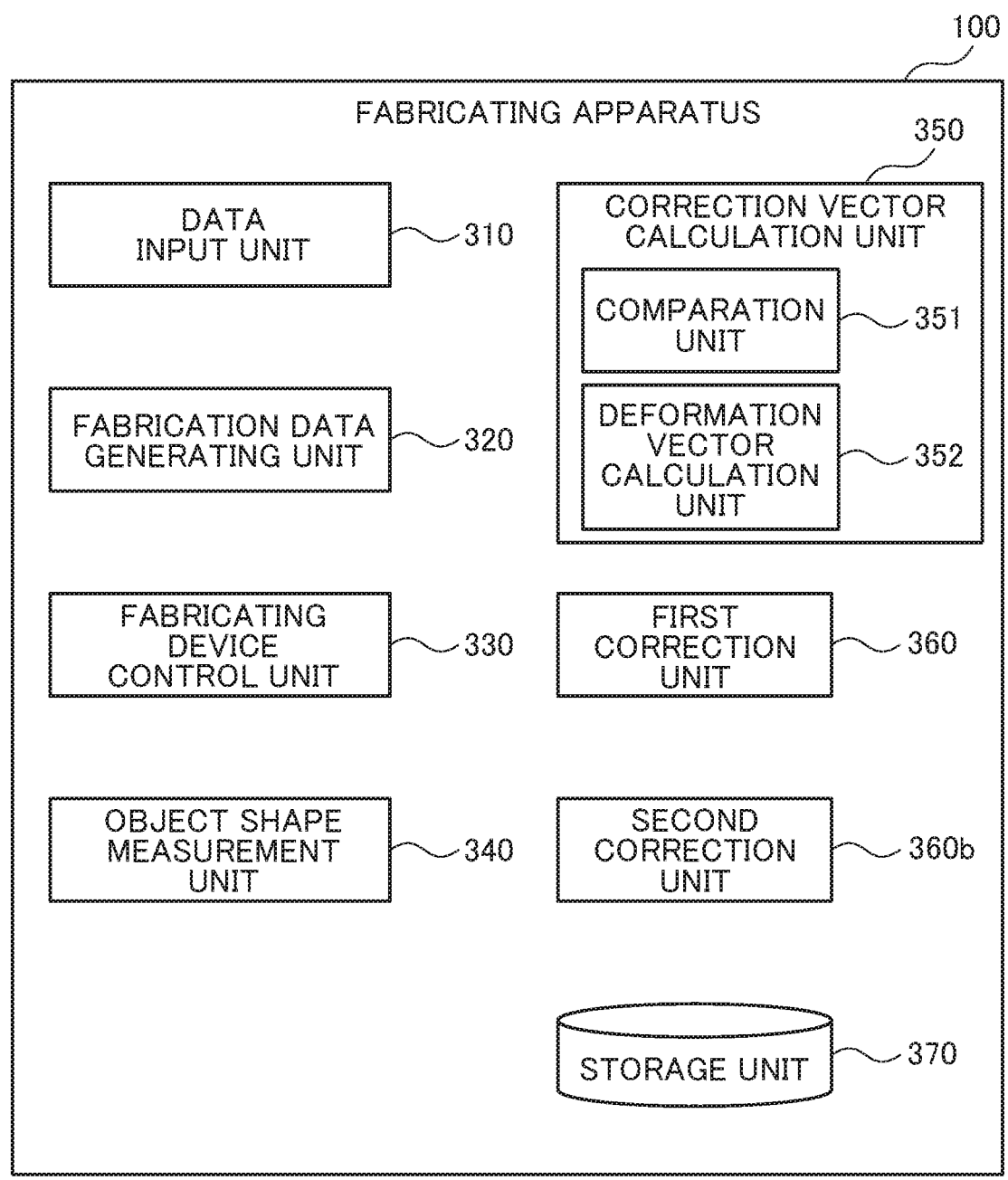
FIG. 3 is a software block diagram included in the fabricating apparatus according to the present embodiment.

Next, a functional unit executed by each of the hardware components in the present embodiment will be described with reference to FIG. 3. FIG. 3 is a software block diagram included in the fabricating apparatus 100 according to the present embodiment.

The fabricating apparatus 100 includes a data input unit 310, a fabrication data generating unit 320, a fabricating device control unit 330, an object shape measurement unit 340, a correction vector calculation unit 350, a first correction unit 360, a second correction unit 360b, and a storage unit 370.

The data input unit 310 receives an input such as shape data for fabricating a three-dimensional object. The shape data is created by the information processing terminal 150 or the like, as an example, and then input to the data input unit 310 via the interface 205.

The fabrication data generating unit 320 divides the shape data input to the data input unit 310 with respect to the height direction of the three-dimensional object, and generates fabrication data of a plurality of fabrication layers. The three-dimensional object to be fabricated is divided in a unit of stacking pitch, thereby generating the fabrication data as data indicating a fabrication layer for fabricating each of layers to be stacked. The fabrication data can be binary data indicating whether fabrication is to be performed in the x-y plane coordinates of each of the layers. Furthermore, in the preferred embodiment, parameters may include the fabrication amount or the discharge amount of fabrication material 140 at each of coordinates in addition to whether fabrication is to be performed on each of coordinates. Note that while the fabrication data generating unit 320 is included in the fabricating apparatus 100 in FIG. 3, the fabrication data generating unit 320 may also be included in the information processing terminal 150. In this case, the fabrication data generated by the information processing terminal 150 is transmitted to the fabricating apparatus 100, and then the fabrication processing is executed.

The fabricating device control unit 330 controls fabrication operation of fabricating device 206 according to the fabrication data. The fabricating device control unit 330 adjusts the position of the head 110 and the height of the stage 120 according to the fabrication data, so as to achieve fabrication while controlling various parameters and algorithms such as a fabrication speed and a stacking pitch. Furthermore, the fabricating device control unit 330 can control the fabrication amount according to the fabrication data. For example, the discharge amount of the fabrication material 140 can be controlled in the FFF method, while the intensity of the laser can be controlled in the SLS method.

The object shape measurement unit 340, as a measurement unit, controls the shape sensor 207 to obtain measurement data such as dimensions and height as a shape of a fabrication layer being fabricated or a shape of an already-fabricated three-dimensional object. The object shape measurement unit 340 obtains a measurement result as measurement data.

The correction vector calculation unit 350 as a calculation means calculates a correction vector according to measurement data and fabrication data. That is, the correction vector calculation unit 350 calculates a correction vector for achieving a desired shape of a three-dimensional object to be fabricated according to fabrication data. The shape of the three-dimensional object might vary in some cases depending on various conditions such as the type of the fabrication material 140 and the ambient temperature. The measurement data used here may be data obtained by measuring a plurality of fabrication layers formed in the first layer to the n-th layer. Meanwhile, the fabrication material 140 might have shrinkage or warpage after being cooled or cured, as compared with immediately after fabrication. Continuing stacking with the remaining shrinkage or the like might result in fabrication of a three-dimensional object different from a desired three-dimensional object. To avoid this, a correction vector based on an error between the fabrication data and the measurement data representing the shape of the actually formed fabrication layer is fed back to the fabrication data for the subsequent layers and correction of the fabrication data is performed. The correction vector calculation unit 350 includes a comparison unit 351 and a deformation vector calculation unit 352.

The comparison unit 351 compares the fabrication data with the measurement data measured by the object shape measurement unit 340. On the basis of the comparison result, the deformation vector calculation unit 352 calculates a vector indicating how the planar shape of the fabricated three-dimensional object is displaced with respect to the fabrication data used as a basis for fabrication. The correction vector calculation unit 350 calculates a correction vector on the basis of the deformation vector. The correction vector is determined so as to reduce the error of the object to be fabricated, and an example of this can be a correction vector that outputs a shape distorted in an opposite direction with respect to the deformation vector.

The first correction unit 360 corrects fabrication data for fabricating a three-dimensional object. The first correction unit 360 can correct the fabrication data so as to change the fabrication operation executed by the fabricating device control unit 330, according to the correction vector calculated by the correction vector calculation unit 350. Here, the change in the fabrication operation refers to a change in parameters or algorithms of the fabrication data. Examples of parameters and algorithms include a shape of a three-dimensional object to be fabricated, dimensions for each of fabrication layers, a height, a fabrication amount based on fabrication data, a melting temperature of fabrication material, a fabrication speed, and a stacking pitch. In a case where the fabrication data has been corrected, the fabricating device control unit 330 executes fabrication processing according to the corrected fabrication data.

In a case where part or all of the fabrication data matches a predetermined shape, the second correction unit 360b applies predetermined correction and outputs corrected fabrication data. One or more predetermined shapes are prepared, and valid correction data is obtained beforehand for each of the shapes.

The storage unit 370 stores various data such as shape data, fabrication data, measurement data, and correction vector into the memory 204. Each of functional units performs writing and reading of various types of data to and from the storage unit 370.

Each of the above-described functional units enables fabrication of three-dimensional objects with high accuracy.

Note that the above-described software block corresponds to a functional unit implemented by a function of each of hardware components achieved by execution of the programs of the present embodiment by the CPU 201. In addition, the functional units described in each of the embodiments may be entirely implemented by software, or may be partially or entirely implemented as hardware providing equivalent functions.

Next, a more specific example of fabricating a desired three-dimensional object in the present embodiment will be described. The following description will be made with reference to FIGS. 4A to 4E and 5 as appropriate. FIGS. 4A to 4E are views illustrating examples in which the shape of the fabrication object is deformed and a feedback correction for the deformation. FIG. 5 is a diagram illustrating a data flow in the present embodiment.

The fabricated three-dimensional object might have an error during a stage of fabrication processing, leading to fabrication with a shape different from the shape in fabrication data. In addition, the three-dimensional object fabricated by the fabricating apparatus 100 undergoes thermal shrinkage while being cooled over time, and the shape of the three-dimensional object might change immediately after fabrication and after cooling. For example, FIG. 4A indicates a shape of a three-dimensional object immediately after fabrication and after cooling. The broken line indicates the shape immediately after fabrication, and the solid line indicates the shape after cooling. The three-dimensional object shrinks from the shape of a broken line to the shape of a solid line by cooling, resulting in fabrication of a three-dimensional object having a shape different from a desired shape. The present embodiment calculates correction vectors for correcting deformation of the planar shape due to fabrication errors or shrinkage of each of layers and corrects the planar shape of each of the layers.

As illustrated in FIG. 5, the object shape measurement unit 340 measures the shape of the x-y plane of the n-th layer of the three-dimensional object having fabricated in n layers and obtains measurement data (planar shape). The comparation unit 351 compares the n-th layer fabrication data (planar shape) with the n-th layer measurement data (planar shape). The deformation vector calculation unit 352 calculates a deformation vector resulting from the shrinkage of the obtained fabrication layer. The correction vector calculation unit 350 calculates a correction vector on the basis of the deformation vector.

Figure 4A:
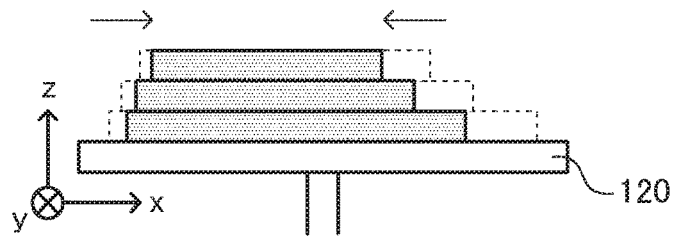
FIGS. 4A to 4E are views illustrating examples of deformation of a fabrication object and feedback correction for the deformation.
Figure 4B:
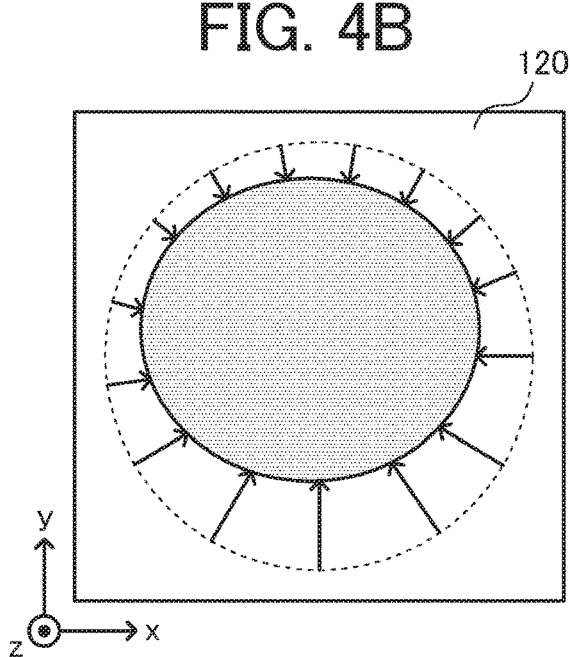

Here, an example of the error of the fabrication layer is illustrated in FIG. 4B. The broken line represents the planar shape based on the fabrication data, and the solid line represents the planar shape of the actually obtained fabrication layer. The comparation unit 351 compares the planar shape based on the fabrication data with the planar shape of the actually obtained fabrication layer. The deformation vector calculation unit 352 calculates a deformation vector on the basis of a comparison result obtained by the comparation unit 351. The deformation vector is represented by arrow lines as illustrated in FIG. 4B, and each indicates the direction and displacement amount of an end portion of the obtained fabrication layer.

Figure 4C:
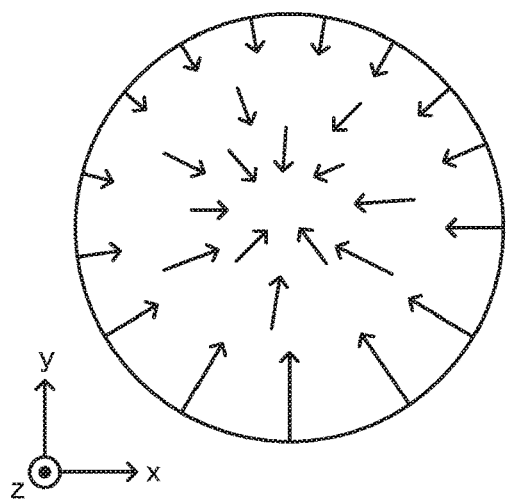

FIG. 4C is an example of a vector field indicating deformation vectors of the entire fabrication layer, which is calculated on the basis of the deformation vector of the planar shape. The vector field can be obtained by estimating a highly probable deformation vector the shape of which is displaced inside the fabrication layer and by interpolating the deformation vector of the planar shape.

The correction vector calculation unit 350 calculates a correction vector to correct the fabrication error of a subsequent layer on the basis of the deformation vector and the vector field illustrated in FIGS. 4A to 4E. For example, in a case where the n-th layer and the (n+1)th layer have an identical shape, deformation generated in the n-th layer is considered to occur, with high probability, also in the (n+1)th layer. Accordingly, the correction vector can be calculated on the basis of the deformation vector of the planar shape of the n-th layer. In another case where the n-th layer and the (n+1)th layer have different shapes, the correction vector can then be calculated on the basis of the vector field indicating the deformation of the entire fabrication layer of the n-th layer. The calculated correction vector is output to the first correction unit 360 as illustrated in FIG. 5.

Figure 4D:
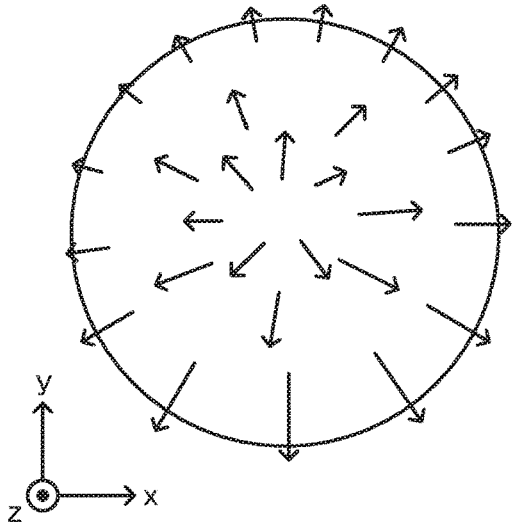

FIG. 4D illustrates an example of a calculated correction vector. The correction vector is typically an inverted version of the deformation vector. The correction vector is decided to be smaller than the magnitude of the deformation vector so as not to oscillate due to overcorrection.

Figure 4E:
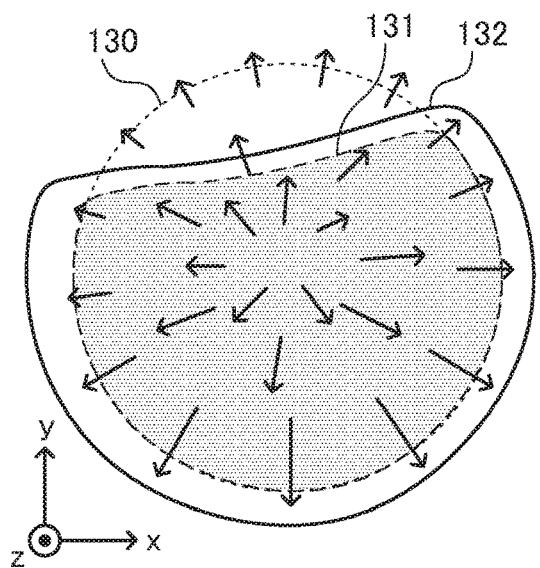

FIG. 4E indicates an example of correction when the n-th layer and the (n+1)th layer have different shapes. It is now assumed that the fabrication data (planar shape) 131 of the (n+1)th layer is given to the fabrication data (planar shape) 130 of the n-th layer. At this time, the shape is corrected by the correction vector, resulting in acquisition of fabrication data (planar shape) 132 (in the example of the figure, the correction amount toward an upper outer end is small while the correction amount toward a lower outer end is large).

The first correction unit 360 corrects the (n+1)th layer fabrication data according to the correction vector, and generates the (n+1)th layer corrected fabrication data. That is, the (n+1)th layer corrected fabrication data is fabrication data in which the displacement amount due to fabrication errors based on the measurement results up to the n-th layer is corrected. The fabricating device control unit 330 controls the fabricating device 206 according to the fabrication data.

Figure 6:
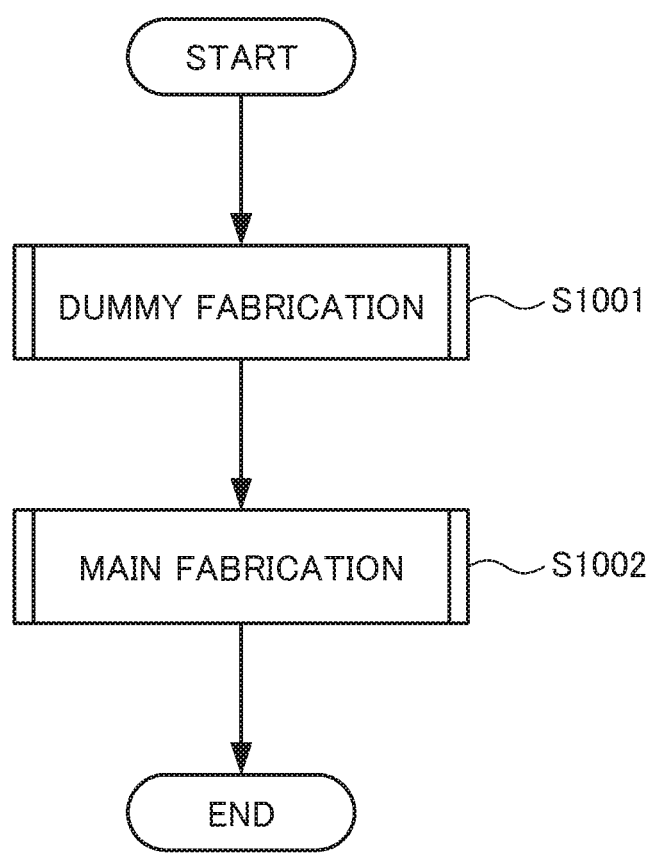
FIG. 6 is a flowchart of fabrication processing of a three-dimensional object performed by a fabricating apparatus according to the present embodiment.

Next, specific processing executed by the fabricating apparatus 100 of the present embodiment will be described. FIG. 6 is a flowchart of processing of fabricating a three-dimensional object by the fabricating apparatus 100 in the present embodiment.

The fabricating apparatus 100 starts fabrication processing from step S1000. In step S1001, the fabricating apparatus 100 performs dummy fabrication processing for revising a correction vector. Dummy fabrication can be omitted.

In step S1002, the fabricating apparatus 100 performs main fabrication processing of fabricating a three-dimensional object having a desired shape. After performing the main fabrication processing, the fabricating apparatus 100 finishes the processing in step S1003.

In the following, details of the shape to be fabricated, the dummy fabrication processing, and the main fabrication processing will be described. FIGS. 7A to 7G are views illustrating deformation of a shape of a fabrication object and feedforward correction and the revision for the deformation according to the present embodiment. FIG. 8 is a flowchart of the dummy fabrication processing according to the present embodiment. FIG. 9 is a flowchart of the main fabrication processing according to the present embodiment. Description of FIGS. 8 and 9 will be made with reference to FIGS. 7A to 7G as appropriate.

Figure 7A:
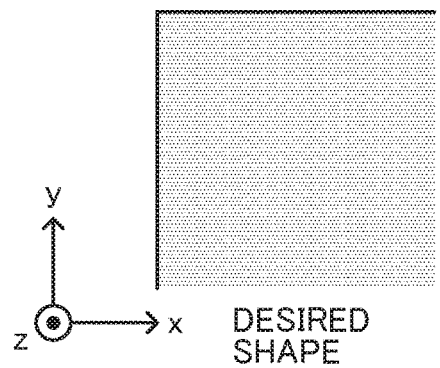
FIGS. 7A to 7G are views illustrating deformation of a shape of a fabrication object and feedforward correction for the deformation according to the present embodiment.
Figure 7B:
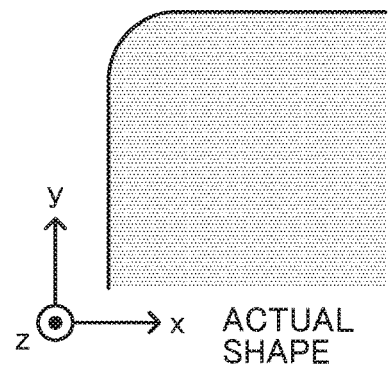
Figure 7C:
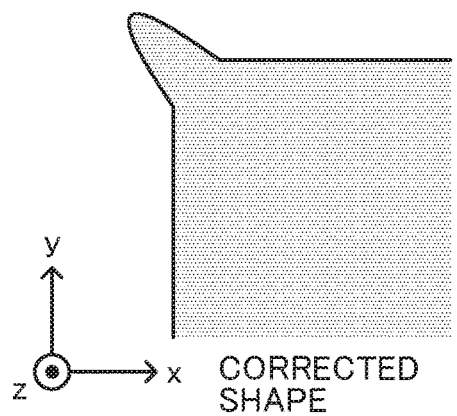
Figure 7D:
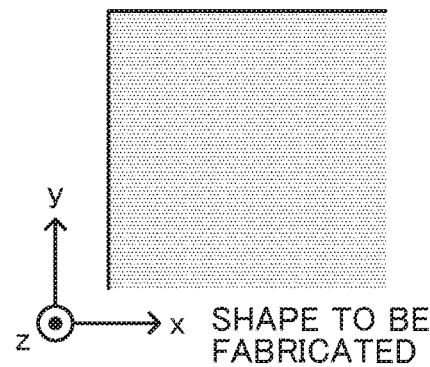
Figure 8:
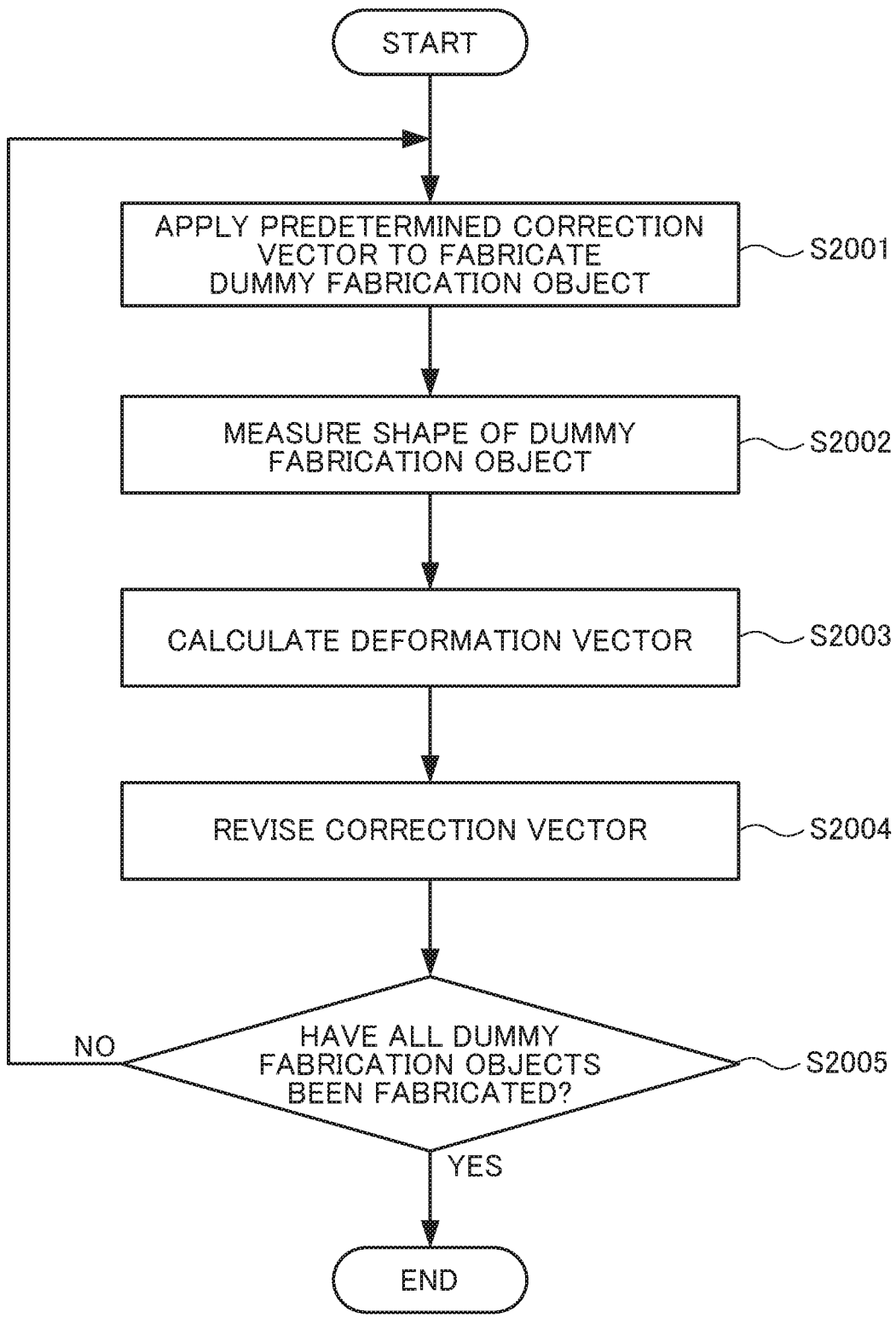
FIG. 8 is a flowchart of dummy fabrication processing according to the present embodiment.

For example, a case where a desired shape is a shape including a 90 degree angle on the x-y plane as illustrated in FIG. 7A will be described. It is assumed here that fabrication made according to this fabrication data would produce a fabrication object having a shape illustrated in FIG. 7B due to the surface tension and viscosity of the fabrication material. That is, the shape would be a shape having a rounded corner, not including the angle of 90 degrees indicated in the fabrication data. The second correction unit 360b performs preliminary correction onto the shape as illustrated in FIG. 7A so as to obtain a shape as illustrated in FIG. 7C. This results in acquisition of an actually fabricated shape as illustrated in FIG. 7D, making it possible to obtain the shape of the desired fabrication data (FIG. 7A).

As illustrated in FIG. 8, the fabricating apparatus 100 starts dummy fabrication processing from step S2000. In step S2001, the fabricating device 206 forms a dummy fabrication object having a predetermined shape. Here, it is assumed as an example that preliminary predetermined correction is performed according to fabrication data including an angle of 90 degrees illustrated in FIG. 7A so as to obtain a fabrication object of FIG. 7C.

Figure 7E:
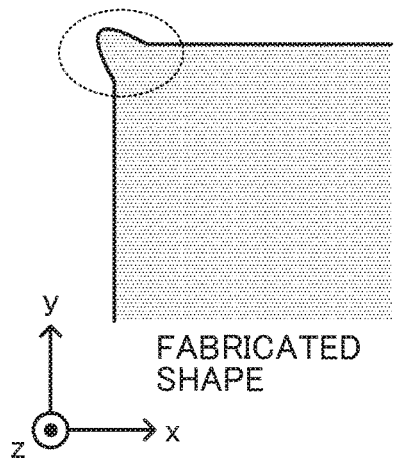
Figure 7F:
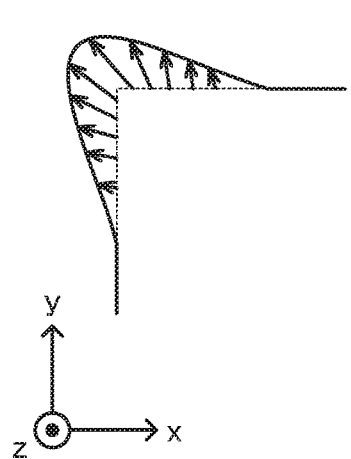

In step S2002, the object shape measurement unit 340 measures the shape of the obtained dummy fabrication object. Here, it is assumed that the shape of the dummy fabrication object is fabricated and measured as illustrated in FIG. 7E. That is, it is assumed that the shape of the corner is sharpened in fabrication in contrast to the shape of FIG. 7A. FIG. 7F is an enlarged view of a region indicated by a broken line in FIG. 7E, and the deformation vector is indicated by arrow lines. The comparation unit 351 compares the fabrication data (in FIG. 7A in the example) with the measurement data (in FIG. 7E in the example).

In step S2003, the deformation vector calculation unit 352 compares the measured shape data of the dummy fabrication object with the fabrication data being the basis of the fabrication and calculates a deformation vector (in FIG. 7F in the example).

Figure 7G:
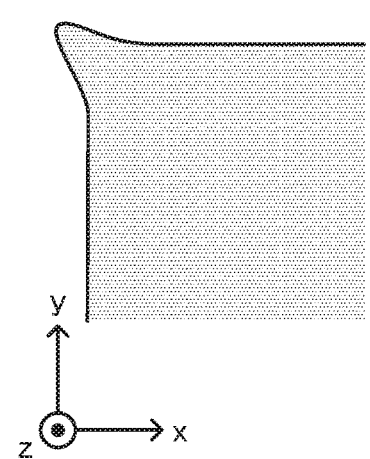

In step S2004, the correction vector calculation unit 350 calculates a correction vector on the basis of the deformation vector in the similar procedure as the procedure illustrated in FIGS. 4A to 4E (in FIG. 7G in the example). Thereafter, the second correction unit 360b performs correction by using the revised correction vector. Note that, in step S2004, the correction vector may be newly calculated, or a preset correction vector may be revised. An identical shape may be fabricated again by applying the revised correction vector and this procedure may be repeated until a desired shape is obtained. The correction vector revised in step S2004 can be stored in the storage unit 370. As a result, while the fabrication data of FIG. 7A was originally planned to be corrected by the second correction unit 360b as illustrated in FIG. 7C, for example, the data is now revised to make correction as illustrated in FIG. 7G.

In calculation of a correction vector by a dummy fabrication object, a correction vector may be calculated on the basis of a plurality of dummy fabrication objects in order to enhance the accuracy of correction. In such a case, processing is branched in step S2005 depending on whether all the dummy fabrication objects have been fabricated and the correction vector has been calculated.

In a case where fabrication and correction vector calculation have been performed for all the dummy fabrication objects (YES in S2005), the processing proceeds to step S2006 to complete the dummy fabrication processing. In a case where fabrication and correction vector calculation have not been calculated for all the dummy fabrication objects (NO in S2005), the processing returns to step S2001 and the processing of steps S2001 to S2004 are repeated for other dummy fabrication objects.

Performing formation of the dummy fabrication object and calculation of the correction vector in this manner makes it possible to enhance the accuracy in fabrication of the fabrication object. For example, it is assumed that the fabrication data as a basis of the dummy fabrication object is in a shape illustrated in FIG. 7A. In a case where this shape is planned to be corrected to the shape as illustrated in FIG. 7C but actually is going to have a shape illustrated in FIG. 7E by dummy fabrication, performing revision of correction to have a corrected shape in FIG. 7G rather than FIG. 7C would make it possible to manage the shrinkage of the corner of the fabrication object, enabling fabrication of a three-dimensional object having a desired shape.

Calculating the correction vector by the dummy fabrication processing would make it possible to enhance the fabrication accuracy in main fabrication processing performed in the next steps. As illustrated in FIG. 9, the fabricating apparatus 100 starts the main fabrication processing from step S3000.

In step S3001, the fabrication data generating unit 320 generates fabrication data of a planar shape as slice data obtained by dividing the three-dimensional shape data input to the data input unit 310 for each of layers. Here, as an example, the desired shape is assumed to be a shape illustrated in FIG. 7A and step S3001 is assumed to have generated fabrication data for fabricating this shape.

In step S3002, the second correction unit 360b applies a correction vector corresponding to the planar shape of the fabrication data and thereby corrects the fabrication data. First, a portion matching a predetermined shape among the fabrication data is searched. For example, it is assumed that there is a portion in the fabrication data that matches FIG. 7A. A correction vector is preliminarily determined for a predetermined shape and correction of this shape is performed by application of this correction vector. In a case where a predetermined correction vector has been revised by dummy fabrication, correction is to be performed by applying the revised correction vector. In other words, correcting the fabrication data to the fabrication data in FIG. 7C involves consideration of deformation due to fabrication errors and shrinkage. Accordingly, three-dimensional object with the shape illustrated in FIG. 7D can be fabricated with high probability. Therefore, in step S3002, a correction vector of the applicable shape is used to correct the fabrication data (correct deformation depending on shape data by using feedforward control). Note that the correction vectors to be applied need not have an identical shape, and correction may be performed by using a correction vector of a similar shape, for example.

In step S3003, the first correction unit 360 applies a correction vector field calculated on the basis of the error between the fabrication data (planar shape) of a previous layer and a fabrication result (planar shape) and thereby corrects the fabrication data (planar shape correction by using feedback control).

In step S3004, the fabricating device control unit 330 controls the fabricating device 206 according to the corrected fabrication data and fabricates the fabrication layer.

Subsequently, in step S3005, processing branches depending on whether all the fabrication layers have been fabricated. In a case where all the fabrication layers have been fabricated (YES in S3005), this means that the three-dimensional object has been completed, and then, the processing proceeds to step S3010 to finish the main fabrication processing. In a case where not all the fabrication layers have been fabricated (NO in S3005), the processing proceeds to step S3006 in order to fabricate the next layer.

In step S3006, the planar shape of the fabrication object is measured in order to correct the fabrication layer of the next layer. Since the fabrication layer fabricated in step S3004 is based on the corrected fabrication data, the layer is fabricated in a desired shape. However, the shape of the fabrication object tends to vary depending on various conditions, and there is a case where deformation from a desired shape occurs even after correction. For example, even with the correction illustrated in FIG. 7C, there is a case where an obtained shape is a shape in which a correction portion protrudes as illustrated in FIG. 7E in a case where the correction amount is excessive. Therefore, in step S3006 and thereafter, as illustrated in FIG. 5, the fabrication data of the next layer ((n+1)th layer) and after the next layer is corrected by the correction vector based on the measurement data of the fabricated layer (n-th layer) and fabricated.

In step S3006, the object shape measurement unit 340 measures the shape of a fabrication object and outputs the measurement data to the correction vector calculation unit 350. The comparation unit 351 of the correction vector calculation unit 350 compares the measurement data of the fabrication object with the fabrication data.

In step S3007, the deformation vector calculation unit 352 calculates a deformation vector of the planar shape of the fabrication layer. Subsequently, the deformation vector calculation unit 352 calculates in step S3008 the deformation vector field of the entire fabrication layer based on the deformation vector.

In step S3009, the deformation vector calculation unit 352 calculates a correction vector on the basis of the deformation vector field. Specifically, a correction vector is calculated in a procedure illustrated in FIGS. 4A to 4E and 5.

After step S3009, the processing returns to step S3003, and each of the above processing is repeated until all the fabrication layers are formed. As a result, a three-dimensional object having a desired shape can be fabricated.

As described above, the shape of the dummy fabrication object may be any shape. FIGS. 10A to 10G are views illustrating examples of a dummy fabrication object.

The dummy fabrication object may be corners having various angles as illustrated in FIGS. 10A, 10B, 10C, 10D, and 10E, for example. In various planar shapes, correction vectors are preliminarily defined and dummy fabrication is performed to revise the correction vectors. With this configuration, the optimum correction vector can be applied widely from the beginning even in arbitrary shapes, leading to enhancement of the fabrication accuracy.

Figure 10A:
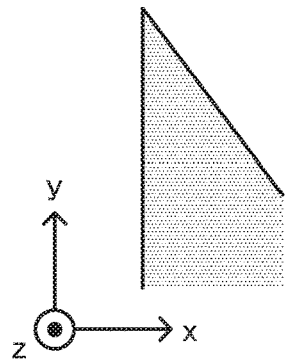
FIGS. 10A to 10G are views illustrating examples of a dummy fabrication object.
Figure 10B:
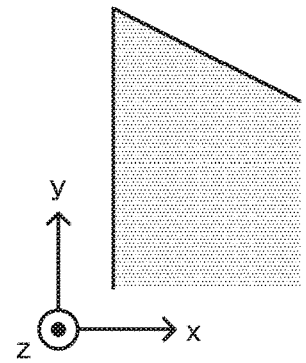
Figure 10C:
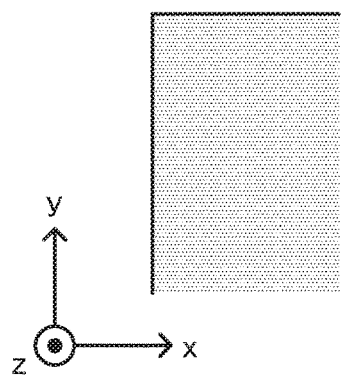
Figure 10D:
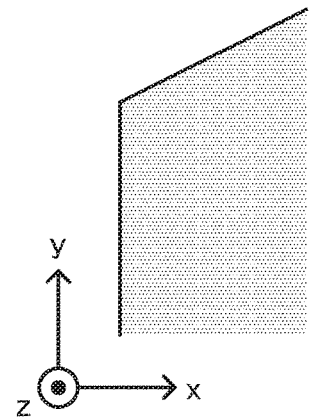
Figure 10E:
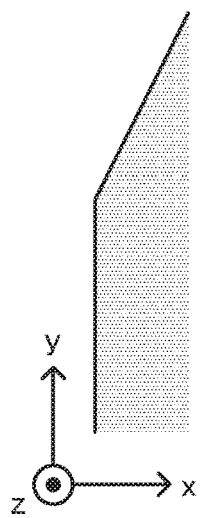
Figure 10F:
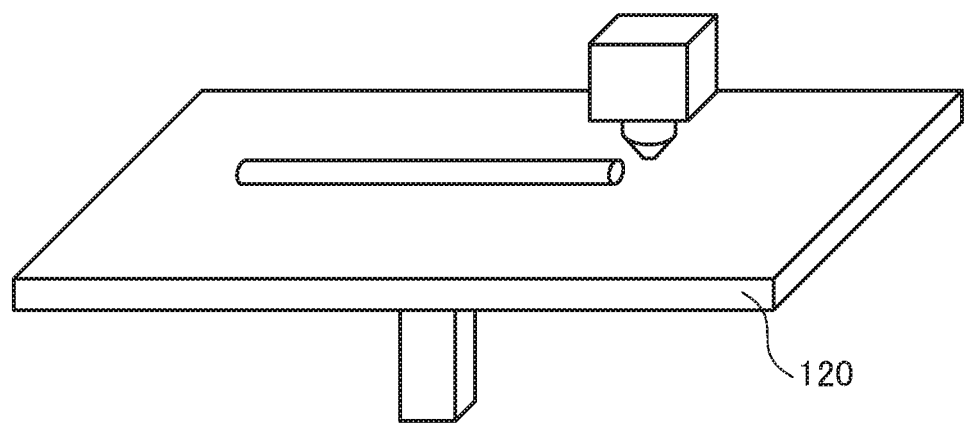

The dummy fabrication object may be one line drawing as illustrated in FIG. 10F. In typical fabrication of a three-dimensional object by the FFF method, the amount of the fabrication material 140 discharged from the nozzle is directly proportional to the line width to be fabricated. However, the amount of the fabrication material 140 discharged might vary depending on various factors such as physical properties and shapes of the raw material, melting temperature, or the like. In order to enhance the accuracy of a three-dimensional object, it is desirable to equalize the line width in fabrication and thus, to stabilize the discharge amount. Therefore, forming the dummy fabrication object in line drawing makes it possible to calculate a correction to an appropriate discharge amount and to enhance the fabricating accuracy.

Figure 10G:
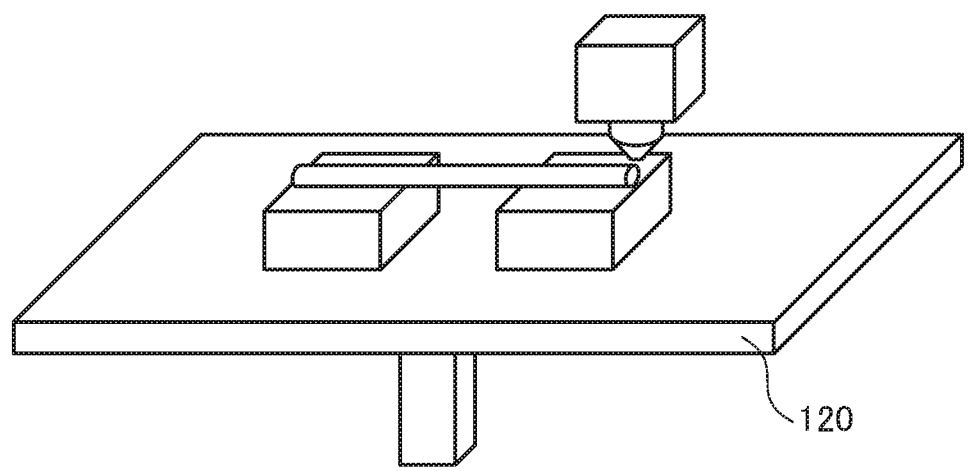

Furthermore, the dummy fabrication object may be a line drawing of a bridge structure having a lifted portion as illustrated in FIG. 10G. Even in the bridge structure without the fabrication layer in a lower layer, it is possible to fabricate the bridge structure by the viscosity of the fabrication material when the length of the lifted portion is short. The bridge structure, however, sometimes hangs down due to its own weight before the three-dimensional object is cured, leading to degradation of the fabrication accuracy. Moreover, hang-down occurring in the bridge structure might reduce the line width, which also leads to degradation of the fabricating accuracy. Therefore, forming the dummy fabrication object in the bridge structure would make it possible to calculate a correction to an appropriate discharge amount, leading to enhancement of the fabricating accuracy, similarly to the case of line drawing.

While FIGS. 10A to 10G illustrate exemplary cases of the fabrication using the FFF method, the line width can be similarly corrected in other fabricating methods. For example, the line width can be corrected by adjusting the laser intensity in the SLS method or the EBM method. The line width in the MJ method can be corrected by adjusting the amount of droplet discharged from the ink jet head.

As described above, according to each embodiment of the present disclosure, a fabricating apparatus, a control device and a method for fabricating a desired three-dimensional object can be provided.

The functions of the embodiments of the present disclosure described above can be implemented by a machine-executable program written in C, C++, C #, Java (registered trademark), or the like. The program of the present embodiment can be distributed in a machine-readable recording medium such as a hard disk device, a compact disc read only memory (CD-ROM), a magneto-optical disk (MO), a digital versatile disc (DVD), a flexible disk, an electrically erasable programmable read only memory (EEPROM), an erasable programmable read only memory (EPROM), etc., and can be transmitted via a network in a format that is readable by other machines.

While the embodiments of the present disclosure have been described above, embodiments of the present disclosure are not limited to the above-described embodiments. Technologies capable of achieving advantageous effects of embodiments of the present disclosure should be included within the scope of the present disclosure within a range of modes that can occur to those skilled in the art.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A fabricating apparatus comprising:
a fabricating device to fabricate a plurality of predetermined fabrication layers according to fabrication data of a three-dimensional fabrication object;
a memory to store a predetermined corrected shape according to a predetermined shape of a fabrication layer; and
processing circuitry configured to:
measure a planar shape including at least one corner of an already-fabricated layer to obtain measurement data; and
correct fabrication data of a subsequent fabrication layer of the plurality of predetermined fabrication layers based on an error between the measured planar shape of the already-fabricated layer and fabrication data of the corresponding layer of the plurality of predetermined fabrication layers; and
fabricate the subsequent fabrication layer according to the corrected fabrication data;
wherein the processing circuitry is configured to perform the correcting fabrication data according to the predetermined corrected shape stored in memory where a part or whole of the measured planar shape of the already-fabricated layer matches the predetermined shape of a fabrication layer stored in memory.

2. The fabricating apparatus according to claim 1, wherein the processing circuitry is configured to measure a dummy fabrication object fabricated by the fabricating device and revise the predetermined corrected shape according to a measurement result of the dummy fabrication object.

3. The fabricating apparatus according to claim 2, wherein the dummy fabrication object is a fabrication object formed by line drawing.

4. The fabricating apparatus according to claim 3, wherein the fabrication object formed by line drawing is a line drawing having a lifted portion.

5. The fabricating apparatus according to claim 1, wherein the processing circuitry is configured to measure a three-dimensional shape of the fabrication object and calculates the planar shape of the plurality of fabrication layers.

6. A control device to control operation of a fabricating apparatus that fabricates a three-dimensional object having a plurality of predetermined fabrication layers, the control device comprising:
a memory to store a predetermined corrected shape according to a predetermined shape of a fabrication layer; and
processing circuitry configured to:
correct fabrication data of a subsequent fabrication layer of the plurality of predetermined fabrication layers according to a difference between a measured planar shape of an already-fabricated layer and fabrication data of the corresponding layer of the plurality of predetermined fabrication layers; and
issue control commands to the fabricating apparatus to carry out fabrication of the subsequent fabrication layer onto the already-fabricated layer according to the corrected fabrication data;
wherein the processing circuitry is configured to perform the correcting fabrication data according to the predetermined corrected shape stored in memory where a part or whole of the measured planar shape of the already-fabricated layer matches the predetermined shape of a fabrication layer stored in memory.

7. The control device according to claim 6,
wherein the processing circuitry is configured to measure a dummy fabrication object fabricated by the fabricating device and revise the predetermined corrected shape according to a measurement result of the dummy fabrication object.

8. The control device according to claim 7, wherein the dummy fabrication object is a fabrication object formed by line drawing.

9. The control device according to claim 8, wherein the fabrication object formed by line drawing is a line drawing having a lifted portion.

10. The control device according to claim 6, wherein the processing circuitry is configured to measure a three-dimensional shape of the fabrication object and calculates the planar shape of the plurality of fabrication layers.

11. A method for fabricating a three-dimensional object, the method comprising:
fabricating a plurality of predetermined fabrication layers of a three-dimensional object according to fabrication data of the three-dimensional object;
measuring a planar shape including at least one corner of an already-fabricated layer to obtain measurement data;
correcting fabrication data of a subsequent fabrication layer of the predetermined plurality of fabrication layers according to a difference between the measured planar shape of the already-fabricated layer and fabrication data of the corresponding layer of the plurality of predetermined fabrication layers; and
fabricating the subsequent fabrication layer according to the corrected fabrication data;
wherein the correcting fabrication data of the subsequent fabrication layer is corrected according to a predetermined corrected shape where a part or whole of the measured planar shape of the already-fabricated layer matches a predetermined shape of a fabrication layer which corresponds to the predetermined corrected shape.

12. The method according to claim 11, further comprising:
measuring a dummy fabrication object fabricated by the fabricating device; and
revising the predetermined corrected shape according to a measurement result of the dummy fabrication object.

13. The method according to claim 12, wherein the dummy fabrication object is a fabrication object formed by line drawing.

14. The method according to claim 13, wherein the fabrication object formed by line drawing is a line drawing having a lifted portion.

15. The method according to claim 11, wherein measuring the planar shape including at least one corner of an already-fabricated layer to obtain measurement data further comprises: measuring a three-dimensional shape of the fabrication object and calculating the planar shape of the plurality of fabrication layers.

* * * * *